United States Patent [19]

Flagg et al.

[11] Patent Number: 4,644,806
[45] Date of Patent: Feb. 24, 1987

[54] AIRSTREAM EDUCTOR

[75] Inventors: Elgin E. Flagg; Melvin Bobo, both of Cincinnati, Ohio

[73] Assignee: General Electric Company, Cincinnati, Ohio

[21] Appl. No.: 725,963

[22] Filed: Apr. 22, 1985

[51] Int. Cl.⁴ .............................................. G01N 1/20
[52] U.S. Cl. .................................... 73/863.58; 55/306
[58] Field of Search .............. 73/116, 863.41, 863.43, 73/863.51, 861.65, 861.66, 861.67, 861.68, 863.58; 55/270, 306; 60/39.092

[56] References Cited

U.S. PATENT DOCUMENTS

| | | | |
|---|---|---|---|
| 3,083,568 | 4/1963 | Soredal | 73/861.65 X |
| 3,252,323 | 5/1966 | Torgeson | 73/863.51 X |
| 3,557,537 | 1/1971 | Roberts | 55/306 |
| 3,978,656 | 9/1976 | Murphy | 60/39.09 |
| 4,047,379 | 9/1977 | Brookes et al. | 60/39.09 |
| 4,268,284 | 5/1981 | Kent et al. | 55/269 |

Primary Examiner—Jerry W. Myracle
Attorney, Agent, or Firm—Gregory A. Welte; Derek P. Lawrence

[57] ABSTRACT

In one form of the present invention, boundary layer air is diverted from a probe in an aircraft and freestream air is induced to impinge upon the probe.

5 Claims, 7 Drawing Figures

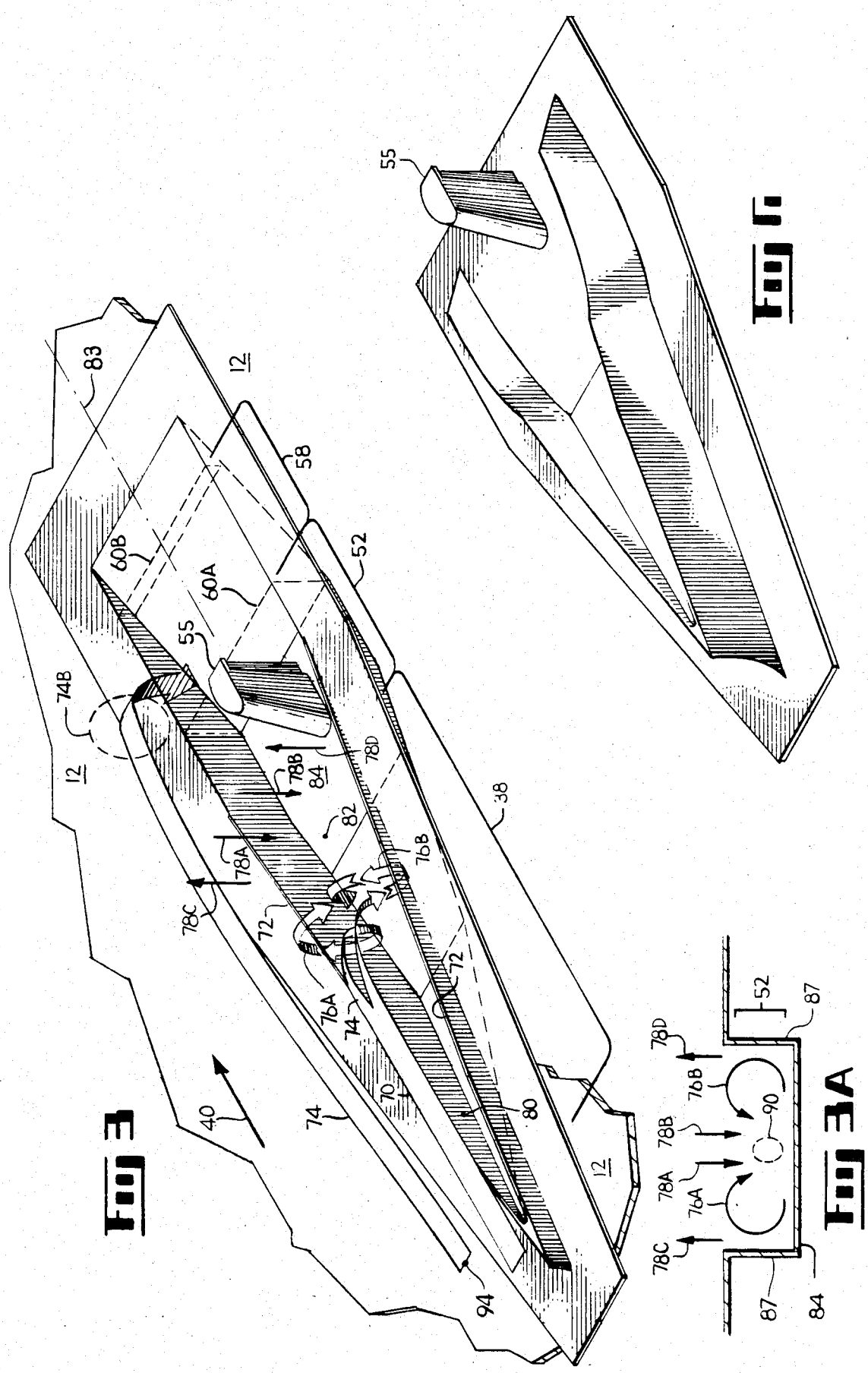

AIRSTREAM EDUCTOR

The present invention relates to the sampling of an airstream which is flowing adjacent to a boundary layer in an aircraft. The sampling is done in order to measure characteristics of the airstream such as temperature and pressure.

BACKGROUND OF THE INVENTION

FIG. 1 illustrates a nacelle 3 which houses a gas turbine engine (not shown) and which is suspended from a wing 6 of an aircraft. It is important to measure characteristics of the incoming airstream 9 such as the airstream's temperature, pressure, and velocity. For this measurement, various types of probes have been devised and they typically extend from the inner barrel 12 of the nacelle 3 as illustrated by probe 15.

FIG. 2 is an enlarged view of the probe 15. Typically, the sensing element 18 of the probe 15 is supported by a mast 21 in order to position the sensing element 18 outside the boundary layer 24 in order to reduce the effects of the boundary layer 24 upon the measurement taken. In general, the boundary layer 24 has vastly different characteristics than the incoming airstream 9 (sometimes called freestream air) in FIG. 1 and so measurement of the boundary layer 24 is to be avoided. For example, one different characteristic results from the fact that some engine nacelles contain apparatus which heat the inner barrel 12 to a few hundred degrees F. in order to inhibit ice formation. This heating artificially alters the temperature of the boundary layer 24, thus causing its temperature to significantly differ from that of the incoming airstream 9 generally.

Irrespective of boundary layer considerations, other problems are faced by the probe 15. One, the probe 15 is apt to be struck by incoming objects such as birds, insects, ice particles, and miscellaneous types of debris. Two, rainwater will certainly impinge upon the sensing element 18. Rainwater tends to alter measurements taken by temperature probes.

Even apart from the above considerations, the incoming airstream 9 is not always parallel to the centerline 27 of the nacelle 3 as shown in FIG. 1. For example, during takeoff, the incoming airstream more closely resembles that shown by arrow 30. A pressure sensor contained in probe 15 in FIG. 2 will give different readings depending upon the direction at which it is impinged by the incoming air. That is, airstreams shown by arrows 33A-B in FIG. 2, which are otherwise identical, will give different pressure readings simply because of the different directions from which they impinge upon the probe 15. It is generally desirable that the angle of attack which an airstream makes upon a pressure sensor be held constant.

OBJECTS OF THE INVENTION

It is an object of the present invention to provide a new and improved sensor for aircraft.

It is a further object of the present invention to provide a duct for an aircraft engine nacelle which reduces the effects of boundary layer air upon airstream sensors and which inhibits the attack of incoming debris and water upon such sensors.

SUMMARY OF THE INVENTION

In one form of the present invention, boundary layer air is diverted from a probe in an aircraft and freestream air is induced to impinge upon the probe.

BRIEF DESCRIPTION OF THE DRAWINGS

FIG. 3 illustrates one form of the present invention.
FIG. 3A illustrates the vortices 76A and B of FIG. 3.
FIG. 6 illustrates another form of the present invention.

DETAILED DESCRIPTION OF THE INVENTION

Figure 1:
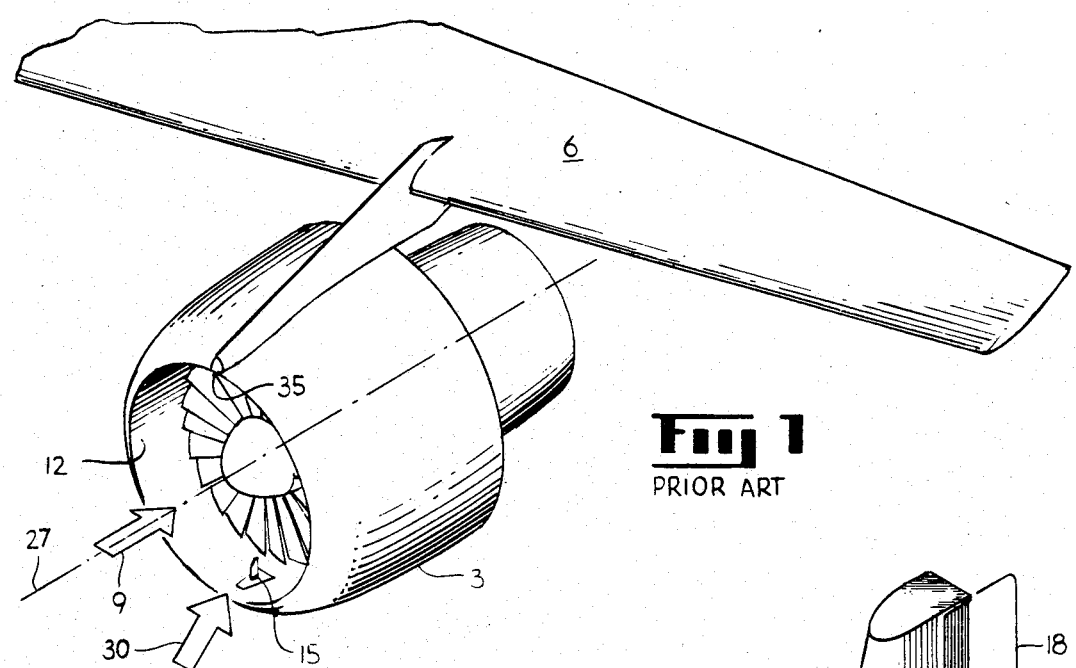
FIG. 1 illustrates a probe 15 in an aircraft engine nacelle.

FIG. 3 illustrates one form of the present invention. The device of FIG. 3 is recessed into the inner barrel 12 of the nacelle 3 of FIG. 1 and it is preferably in the upper half, above line 35, in order to reduce impact damage caused by ingested runway debris.

Figure 4:
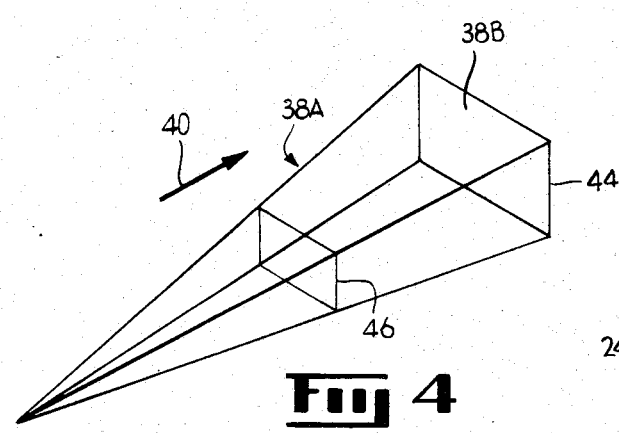
FIG. 4 illustrates the pyramidal shape of a region 38 in FIG. 3.

The invention of FIG. 3 includes a diffusing receiver channel 38 which is generally pyramidal as shown by pyramid 38A in FIG. 4 except, of course, the receiver channel 38 in FIG. 3 has no surface corresponding to surface 38B in FIG. 4: the receiver channel 38 is 3-sided.

The receiver channel 38 is termed diffusing because its cross-sectional area increases in the downstream direction, downstream being indicated by arrow 40. That is, rectangle 44 in FIG. 4 is larger in area than rectangle 46. Also, the receiver channel 38 penetrates the surface 12 of the nacelle 3 such that angle 65B in FIG. 5 is approximately 10 degrees.

Figure 5:
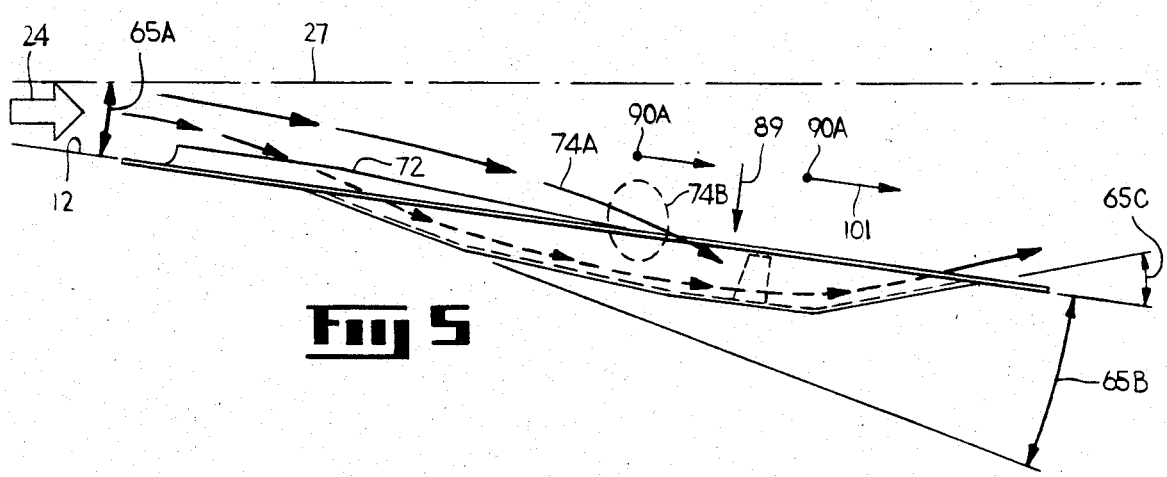
FIG. 5 is a side view of FIG. 3.

Downstream of the receiver channel 38 in FIGS. 3 and 5 is positioned a sampling channel 52 which remains substantially constant in cross-sectional area as one proceeds in the downstream direction 40. A sampling probe 55 is positioned in the sampling channel 52 and the probe typically contains a pressure sensor and a temperature sensor (not specifically shown). Downstream of the sampling channel 52 is located an ejector channel 58 which decreases in cross-sectional area in the downstream direction as shown by rectangle 60A as compared with rectangle 60B. FIG. 5 is a side view of the device of FIG. 3 and installed in a nacelle inner barrel 12. Angles 65A-C have the following respective values: 10, 10, and 20 degrees.

The present invention is believed to operate as follows. An incoming, moving, airstream 70 in FIG. 3 encounters the theoretically stationary boundary layer air at the edges 72 of the diffusing receiver channel 38 in FIGS. 3 and 5 and, because the incoming airstream 70 has a finite, nonzero viscosity, the incoming airstream 70 turns into the receiver channel 38 as shown by curved arrows 74. As the airstreams 74 progress downstream, they evolve into vortices 76A and B (also shown in FIG. 3A). This vortex formation is assisted by the diffusing characteristics of the receiver channel 38, which cause a reduction in air speed: the speed is less at point 82 than at point 80.

One important aspect of the vortices 76A and B resides in their directions of rotation. The directions are such that vortex air is traveling toward the channel floor 84 in FIG. 3A (as shown by arrows 78A and B)

near the centerline 83 in FIG. 3, but away from the channel floor 84 in FIG. 3A near the channel walls 87 (as shown by arrows 78C and D). Characterized another way, the vortices 76A and B straddle the centerline 83 of the diffusing receiver channel 38, and each rotates oppositely to the other. Further, the directions are such that airflow is toward the channel floor 84 near the centerline.

These vortices 76A and B in FIG. 3A induce a low pressure zone 90 in the sampling channel 52 as shown in FIG. 3A. The low pressure zone 90 induces a sample airstream 74A in FIGS. 3 and 5 to flow into the low pressure zone, as shown by the curve in the arrow in region 74B in FIG. 5. The sample airstream 74A originates approximately at point 94 in FIG. 3 which is above the boundary layer 24. Viewed another way, the sample airstream 74A is dragged along by the adjacent vortices 76A and B and, since the direction of arrows 76A and B is toward the channel floor 84 near the center, the airstream 74A is carried toward the channel floor by them.

Figure 2:
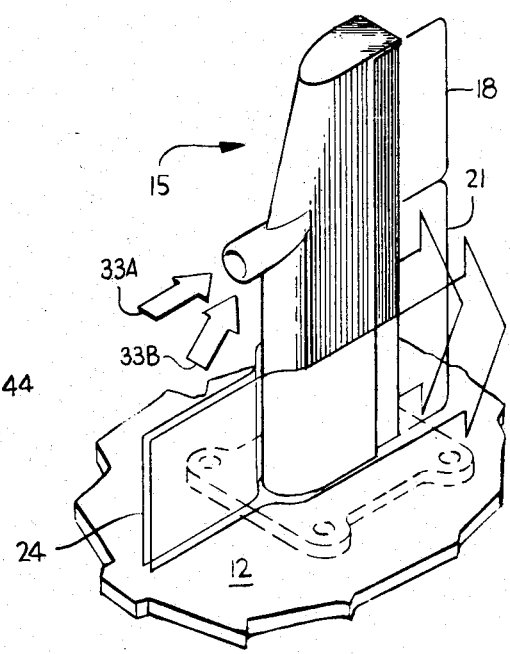
FIG. 2 is an enlarged view of the probe 15 of FIG. 1.

Accordingly, the sensor 55 receive an airstream 74A which is tapped outside the boundary layer 24 in FIG. 2 (i.e., tapped at point 94 in FIG. 3), and is thus more representative of incoming airstream generally. Further, Applicants have found that the acceleration of the airstream 74A toward the probe 55 (that is, in the direction of arrow 89 in FIG. 5, which is toward the channel floor 84) is so great that particles 90A (such as rain, ice, or debris) are thrown out of this sample airstream 74A. The particles continue to travel along the paths shown by arrows 101 rather than follow the sample airstream 74A. The sample airstream 101 is thereby centrifuged and filtered.

An invention has been described for collecting an airstream to be measured by sensing probes. The invention is preferably positioned on the inner surface (or barrel) of an aircraft engine nacelle. The invention collects an airstream from a region which is substantially outside of the influence of the boundary layer 24 in FIG. 3. The freestream air is sampled, not the boundary layer. This functioning occurs despite the fact that the probe 15 is positioned below or within the boundary layer itself as shown in FIG. 3. That is, the present invention actually splits the boundary layer (shown as arrow 70 splitting into curved arrows 74 in FIG. 3) and draws a sample airstream 74A from point 94, through the split in the boundary layer, and to the probe 55 where it is sampled.

One important aspect of the present invention resides in the fact that the need for a mast 21 in FIG. 2 to support the sensors outside the boundary layer is eliminated. As pointed out above, sensors 55 in FIG. 3 are actually located within, or below, the boundary layer.

Another important aspect of the present invention lies in the fact that it channels the sampled airstream 74A in FIG. 3 along a path which is generally parallel with the centerline 83. This channeling causes the sample airstream 74A to impinge upon the probe 55 from the same general direction, regardless of the direction of the incoming airstream 9 in FIG. 1. This aspect avoids the inaccuracies discussed in connection with airstreams represented by arrows 9 and 30 in FIG. 1 and 33A and 33B in FIG. 2. The present invention thus compensates for deviations in pressure sensor readings which otherwise occur when the attitude of the aircraft changes.

The present invention need not penetrate the inner surface 12 of the nacelle as shown in FIG. 5, but may be attached atop the surface. Accordingly, an embodiment for such surface attachment is shown in FIG. 6 and it is considered to be self explanatory. The second embodiment operates in a manner similar to that of FIG. 3, with the exception that the ejector channel 58 in FIG. 3 is absent in FIG. 6.

Applicants point out that some probes 15 have inherent water separating capabilities. The present invention can be used with such probes and it will enhance such capabilities by providing a prefiltered airstream 74A having a reduced water content.

Numerous modifications and substitutions can be undertaken without departing from the true spirit and scope of the present invention as defined in the following claims.

What is desired to be scured by Letters Patent is the following:

We claim:

1. In an aircraft nacelle bearing a probe, the improvement comprising:
   (a) means for diverting boundary layer air from the probe and
   (b) means for inducing freestream air to impinge upon the probe.

2. In an aircraft nacelle bearing a probe on its inner barrel and in which the inner barrel is subject to boundary layer airflow, the improvement comprising:
   (a) means for inhibiting boundary layer air from impinging upon the probe and
   (b) means for accelerating freestream air through the boundary layer for
      (i) impingement upon the probe and
      (ii) separation of particulate matter from the freestream.

3. A filter for filtering incoming airstreams in an aircraft engine nacelle comprising:
   (a) a sampling channel;
   (b) diffusing receiver means positioned upstream of the sampling channel for
      (i) receiving a first incoming airstream and
      (ii) modifying the first incoming airstream to induce a second airstream, which is farther from the diffusing receiver means than is the first incoming airstream, to accelerate into the sampling channel.

4. A filter according to claim 3 and further comprising a probe positioned in the sampling channel for receiving the second airstream.

5. A flow separator for use in a nacelle in an aircraft comprising:
   (a) a sampling channel containing a sensor;
   (b) a diffusing receiver channel positioned upstream of the sampling channel for
      (i) receiving a first airstream which includes boundary layer air;
      (ii) generating oppositely moving vortices within either or both the diffusing receiver channel and the sampling channel, the vortices
         A. rotating toward the centerline of the sampling channel and
         B. causing a pressure differential to occur between a region near the probe and the freestream air, the pressure differential
            1. causing freestream air to accelerate toward the probe and
            2. causing particulates within the accelerated air of (b) (ii) (B) (2) to accelerate less than the accelerated air.

* * * * *